US009384195B2

(12) United States Patent
Zaffino et al.

(10) Patent No.: US 9,384,195 B2
(45) Date of Patent: Jul. 5, 2016

(54) MULTIMEDIA FILE DROP IN A WIRELESS DEVICE

(75) Inventors: Richard Zaffino, Kirkland, WA (US);
Arnold Schrider, Issaquah, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1766 days.

(21) Appl. No.: 12/272,995

(22) Filed: Nov. 18, 2008

(65) Prior Publication Data

US 2010/0125610 A1 May 20, 2010

(51) Int. Cl.
*G06F 7/00* (2006.01)
*G06F 17/00* (2006.01)
*G06F 17/30* (2006.01)

(52) U.S. Cl.
CPC ............................... *G06F 17/30017* (2013.01)

(58) Field of Classification Search
CPC ............ H04L 29/06027; H04L 65/103; H04L 65/104; H04L 67/2823; H04L 67/2828; H04L 67/322; G06F 17/30017; G06F 17/3012
USPC ........... 709/203, 250; 707/899; 370/389, 412; 455/404.1, 432.3; 713/168; 725/23; 719/316
See application file for complete search history.

(56) References Cited

U.S. PATENT DOCUMENTS

| | | | | |
|---|---|---|---|---|
| 8,024,568 B2* | 9/2011 | Rao et al. | ....................... | 713/168 |
| 8,201,188 B2* | 6/2012 | Davis et al. | ................... | 719/316 |
| 8,514,871 B2* | 8/2013 | Anschutz et al. | ............. | 370/412 |
| 2002/0016818 A1* | 2/2002 | Kirani et al. | ................... | 709/203 |
| 2004/0186918 A1* | 9/2004 | Lonnfors et al. | ............... | 709/250 |
| 2005/0233742 A1* | 10/2005 | Karaoguz et al. | ........... | 455/432.3 |
| 2009/0047922 A1* | 2/2009 | Buckley et al. | ............ | 455/404.1 |
| 2009/0279545 A1* | 11/2009 | Moonen | ........................ | 370/389 |
| 2012/0210341 A1* | 8/2012 | Burke et al. | .................... | 725/23 |

* cited by examiner

*Primary Examiner* — Susan Chen

(57) ABSTRACT

A mobile communication device may operate with a number of different applications, each having different file types associated therewith. A file analyzer receives data files and analyzes the files to identify a content type and thereafter associates the identified file with the appropriate application or applications. The received data files may be delivered through a wired connection, a wireless connection, or through the introduction of a memory device, such as a removable storage device, to the mobile communication device. The file analyzer may provide the appropriate notification or indication of association or association to the application associated with the identified content type and may further provide user notification of a newly delivered file. The files may be data files, such as text or multimedia files such as audio and/or video files. Files that are incompatible with the wireless communication device may be rejected by the file analyzer or left to the user to make a manual determination of content type and association with the appropriate application.

22 Claims, 3 Drawing Sheets

MULTIMEDIA FILE DROP IN A WIRELESS DEVICE

BACKGROUND OF THE INVENTION

1. Field of the Invention

The present invention is directed generally to multi-media file processing in a wireless device and, more particularly, to a system and method for analyzing and categorizing multimedia data files received by a wireless device.

2. Description of the Related Art

Mobile wireless devices can accept and render a variety of content types. For example, mobile devices can accept audio data, ringtones (a specialized form of audio data), video data, and the like. Such content is not always easy to identify given the different methods by which data is delivered to the mobile device and given the wide range of content types and file container formats for holding content. For example, data may be delivered via a browser download, service-specific clients, side-load; removable memory, thumb drive, Bluetooth, peer-to-peer WiFi connection, and other techniques by which data files are delivered to the mobile device.

Downloaded content is often accompanied by data which may purport to identify the content. For example, downloaded content may be accompanied by a Multi-Purpose Internet Mail Extension (MIME) type, such as audio/3GPP, which serves as a hint to the mobile device as to the type of content being delivered. However, MIME types are not available in a number of file delivery scenarios.

A common technique is to infer content types based on the file name extension (e.g., .mp4). However, this approach is often inadequate because file name extensions may identify the "container," but not identify the content. For example, a file with an .mp4 extension could contain AAC audio or AMR audio. A file may contain multiple content types simultaneously, such as AAC audio and MP4 video. Thus, content identification based on file extension types or MIME types are inadequate to determine actual content type. Therefore, it can be appreciated that there is a significant need for a system and method that allows the accurate determination of file content type and which processes received data files based on the identification of content. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The present disclosure is directed to the identification, processing, and storage of data files downloaded to a mobile device. As noted in the background, files may be delivered to the mobile device using a variety of different techniques. The mobile device constructed in accordance with the present teachings analyzes various aspects of the file to determine the content type and whether it is compatible with the mobile device. If so, the file may be accepted for storage in association with an application that may be used to render the file. For example, a ringtone application stores and identifies ringtones for selection by a user. Therefore, it would be inappropriate to download and store a video file in association with a ringtone application.

When the downloaded file is identified and stored, the application associated with that downloaded data file may be notified of the arrival of a new file. Similarly, the mobile device may provide an indication to the user that a new file has been received and is available for use. Files may also be registered with an application. This process is similar to notification except that a registration process may involve posting the received data file in an area of memory in an area that an application may inspect when it is executed. This type of registration process is used, for example, in Windows Media Player in which the application can play WMA files but in which MP3 files are registered to iTunes. Other known processes may also be used to incorporate downloaded files into the device for use by applications.

Figure 1:
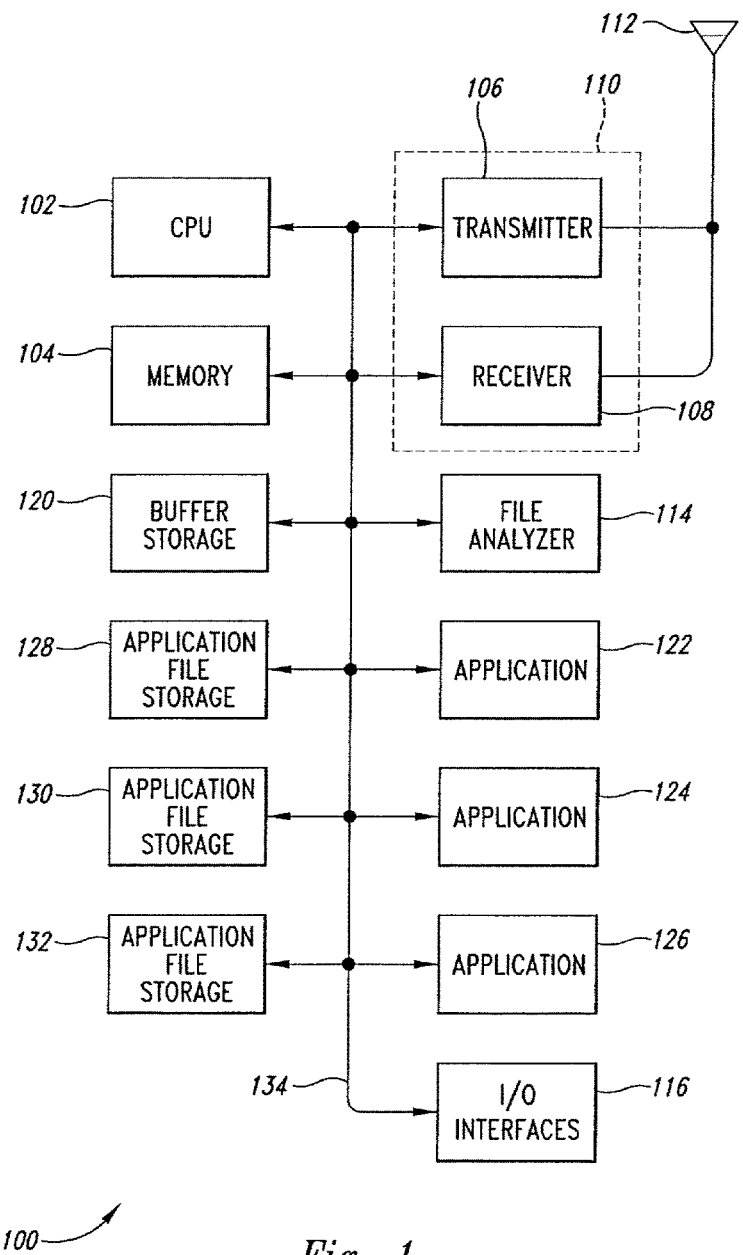
FIG. 1 is a functional block diagram of a mobile device constructed in accordance with the present teachings.

The present invention is illustratively embodied in a mobile device 100 illustrated in the functional block diagram of FIG. 1. The mobile device 100 includes a central processing unit (CPU) 102 and a memory 104. In general, the memory 104 stores data and instructions that control the operation of the CPU 102. The CPU 102 may be implemented using a variety of known technologies. For example, the CPU 102 may be a conventional microprocessor, a microcontroller, a digital signal processor (DSP), a programmable gate array (PGA), custom circuit, or the like. The mobile device 100 is not limited by the specific form of the component used to implement the CPU 102.

Similarly, the memory 104 may be implemented using a variety of known technologies. The memory 104 may include random access memory (RAM), read-only memory, flash memory, programmable memory, removable memory storage devices or the like. In one embodiment, a portion of the memory 104 may integrated into a device with the CPU 102. The mobile device 100 is not limited by the specific form of components used to implement the memory 104.

The mobile device 100 also includes a transmitter 106 and receiver 108, such as may be used for normal wireless communication with a wireless network (not shown). In a typical embodiment, the transmitter 106 and receiver 108 may be implemented as a transceiver 110. The transceiver 110 is coupled to an antenna 112. Operation of the transceiver 110 and antenna 112 is well known in the art and need not be described in greater detail herein. However, those skilled in the art will appreciate that the principles of the present disclosure are applicable to various wireless communication standards and various multiple-access techniques.

The mobile device 100 also includes a file analyzer 114. As will be described in greater detail below, the file analyzer 114 performs different analytical processes to identify the content type of a downloaded data file and associates the data file with one or more applications. Upon identification, the downloaded data file may be stored in association with a particular application. In one embodiment, the downloaded file whose content has been identified may be moved to a specific storage location associated with an application. In another embodiment, files whose content has been identified may be stored in a general storage area and virtually associated with an application program. In addition, the file analyzer 114 may provide notification to applications that new data files are available. The file analyzer 114 may perform similar notification processes to advise a user of the mobile device 100 that new files are available for use.

The mobile device 100 also includes I/O interfaces 116, which is representative of conventional I/O connections for a typical wireless communication device. For example, the I/O interfaces 116 may provide a wired USB connection, thumb drive connection, removable storage connection, or the like. In addition, the I/O interfaces 116 may provide wireless connectivity, such as Bluetooth. These conventional interface types are known in the art and need not be described in greater detail herein. Furthermore, the interface types described above are merely some examples of different techniques by which a data file may be delivered to the mobile device 100. The mobile device 100 is not limited by any particular I/O interfaces 116.

Although not illustrated in FIG. 1, those skilled in the art will appreciate that the mobile device 100 also includes conventional components, such as a key pad, video display, audio output, and the like. For the sake of clarity, those elements are not illustrated in FIG. 1.

The mobile device 100 also includes a buffer storage 120. As will be described in greater detail below, the mobile device 100 may accept downloaded files and store the files in the buffer storage 120 until the file content and type has been determined. The buffer storage 120 functions as a buffer to provide a convenient temporary or permanent storage location that does not interfere with normal operation of the mobile device 100. The downloaded files may be stored in the buffer storage 120 until the content has been identified by the file analyzer 114. In an exemplary embodiment, the downloaded files may be disabled until identified by the file analyzer 114. In this manner, downloaded files whose content has not been identified will not interfere with operation of application programs. Once the content type of a downloaded file has been identified, the file may be moved from the storage buffer 120 to a storage area associated with the application file. Alternatively, the downloaded file may remain in the buffer storage 120 and enabled for operation with one or more of the application programs that utilize the identified file content type.

FIG. 1 also illustrates different applications that may utilize downloaded data files. Those skilled in the art will appreciate that a number of different applications may be present in a single mobile device 100. For example, one application may involve ringtones. The mobile device 100 may allow the user to select from a variety of different ringtones that are preprogrammed into the mobile device or downloaded. As new ringtones are downloaded to the mobile device 100, the application associated with the ringtones must be made aware of the availability of these new files. In addition, the user must be made aware of the availability of new ringtone files.

In another example, an application may be a codec used to render music files. Again, the music files may be provided initially to the mobile device. However, it is more typical that the user will download music files from various sources. The music files may be obtained online from a designated website or downloaded from the user's personal computer (PC). The term "side loading" is sometimes used to refer to the process of downloading files to a PC and then transferring some or all of the files from the PC to an external device, such as the mobile device 100. This may involve transferring only selected files from the PC to the external device or synchronizing the external device to the PC such that the external device and the PC have the same content.

The newly downloaded data files must be made available to the appropriate application. In one embodiment, the application is made aware of newly available downloaded music files in the buffer storage 120. Alternatively, the downloaded files may be stored in an area reserved for file associated with a particular application, such that the application will automatically look to that location to determine the available content. In yet another alternative embodiment, the downloaded content has data file names which the application can identify as corresponding to data files for that application. For example, a music player may automatically search for all MP3 files. In addition, it may be advantageous to make the user aware of the availability of additional downloaded music files. Those skilled in the art will appreciate that a single mobile device 100 may contain more than one music player. Thus, there may be multiple applications that render music files in accordance with different codec protocols.

In yet another example of an application, the user may download a game program in which a data file may be periodically downloaded with additional game data. For example, a question and answer trivia game may require periodic updates to provide new questions and answers for the user. This is often provided in the form of a subscription service to the user of the mobile device 100. In this example, the application itself may be initially downloaded. However, data files, such as questions and answers, along with audio files and/or video files may also be subsequently downloaded to operate in conjunction with the downloaded game application.

These are merely examples of the type of applications that may be executed on the mobile device 100. The mobile device 100 is not limited by any specific type or combination of applications that may use downloaded files. In each of the examples described above, downloaded files are associated with specific applications. The mobile device 106 is able to accept downloaded files, identify the file type and content and associate that data file with the appropriate application. The functional block diagram of FIG. 1 illustrates three applications generically identified as application 122, application 124, and application 126. These applications may be considered generically representative of the type of applications described above.

The mobile device 100 also includes application file storage associated with each respective application. In FIG. 1, an application file storage 128 is associated with the application 122. Similarly, an application file storage 130 is associated with the application 124, while an application file storage 132 is associated with the application 126. Those skilled in the art will appreciate that the application file storage could overlap or even be shared. That is, it is not necessary for satisfactory operation of the mobile device 100 that each application have a unique storage location designated for data files associated only with that application.

The designated storage logically associated with each application provides a convenient storage area from which an application can process data knowing that the files in the associated storage area are compatible with operation of the particular application. As noted above, designated storage may consist of predetermined storage areas within the memory 104. However, in more typical application, data content and application mapping may be maintained in a database or registry such that an application knows which data files are associated therewith.

Some components illustrated in FIG. 1, such as the buffer storage 120 and the application file storage 128-132 may be formed as part of the memory 104. Similarly, the file analyzer 114 and the applications 122-126 may be implemented as a set of computer instructions contained within the memory 104 and executed by the CPU 102. However, these various components are illustrated as separate blocks in the functional block diagram of FIG. 1 since each component performs a separate operational function within the mobile device 100.

The various components illustrated in FIG. 1 are coupled together by a bus system 134. The bus system 134 may comprise an address bus, data bus, control bus, power bus, and the like. For the sake of convenience, the various buses are illustrated in FIG. 1 as the bus system 134.

When the mobile device 100 receives a downloaded data file, the file analyzer 114 performs a series of analytical tests to determine the file content. As noted in the background of the invention, some downloaded files include a Multi-Purpose Internet Mail Extension (MIME) type associated with the downloaded file. However, many MIME types are ambiguous and, taken alone, may be insufficient to distinguish the content of the data. As will be described in greater detail below, the file analyzer 114 performs checks on a received data file to identify the content and type of the data file. This may include, but is not limited to, a file context analysis, file content analysis, file name analysis, file extension analysis, file size analysis, file duration analysis, metadata analysis, and MIME analysis. In addition, the various analytical processes may be performed individually or in combination. In addition, the file analyzer 114 may apply one or more of these techniques in accordance with a set of rules to generate a rules-based analysis. The rules may be hardwired into the mobile device 100 at the time of manufacture or may be stored as a rules file that may be periodically updated. The rules file may be updated using a conventional network connection such as the Internet, or updated in a known fashion using conventional over-the-air programming techniques or other file update techniques.

A file context analysis looks at the source of the downloaded data file. For example, if the mobile device 100 is connected to a music player on a PC, the file analyzer 114 can identify the downloaded file as a music file. Similarly, if the mobile device 100 is connected to music file library, such as iTunes, the file analyzer may identify the downloaded data file as a music file. Thus, context provides one piece of information regarding the content and type of downloaded data file.

In another example, use of a dedicated application may set the context for the content type of the downloaded file and the file analyzer 114 determines, largely through assumption, to deliver the file to a specific location. For example, a Windows Media Player can transfer a .mp3 data file to the mobile device 100. The mobile device 100 assumes that the downloaded .mp3 data file is music and can store it in the application file storage (e.g., the application file storage 128) associated with the music playing application (e.g., the application 122) of the mobile device 100. Other, more complicated contexts can be used by the file analyzer 114 to evaluate sophisticated protocols used to transfer information about the context to the mobile device 100.

The file analyzer 114 may also use a priori knowledge about device capabilities of the mobile device 100 as well as a priori knowledge of content type and storage requirements to identify a content type for a data file with a suitable content and storage in a specific location (e.g., the application file storage 130) or in association with specific applications. For example, the mobile device 100 may communicate with a "store" that provides downloadable ringtones. Given this knowledge, the file analyzer 114 will identify the file as a ringtone file and store it in the appropriate storage location (e.g., the application file storage 130) associated with the ringtone application (e.g., the application 124) or otherwise make the content available only to ringtone applications capable of consuming such content.

The file analyzer 114 may also perform a file name analysis and/or a file extension analysis. A file name for a music file often includes the artist's name and the track name. By cooperation with music file sources, such as iTunes, it may be possible to standardize the file naming nomenclature for music files. Similar agreements may be achieved with respect to other files, such as video files, ringtone files, and the like. However, even in the absence of the cooperative agreements, the file analyzer 114 may be configured to recognize artist's names for music files or video files. The identification of an artist's name or particular file name format could indicate to the file analyzer that a particular downloaded file is of a certain content and type.

Similarly, file extensions can be cooperatively used to identify certain file content and types. Under certain circumstances, file extensions may definitively identify the file content and type. However, as noted above, the same file extensions (e.g., .mp4) may contain multiple different types of audio data files or video data files. In the absence of cooperative agreements, file extension analysis may not be conclusive by itself. However, as described herein, the file analyzer 114 does not rely on any one form of analysis, but analyzes a number of different factors to determine the file type and content.

The file analyzer 114 may also analyze file size and file duration. In a file size analysis, the file analyzer 114 may make certain assumptions regarding the content based on file size. For example, an audio file of short duration may be a music file. However, if the downloaded audio file is sufficiently short, there is a greater likelihood that it is a ringtone rather than a music file. In one scenario, the file analyzer may arbitrarily determine that an audio data file less than 300 kilobytes in size will be designated a ringtone. Those skilled in the art will recognize that other file sizes may be designated as a cutoff for ringtone data files. Typically ringtone data files need not be more than approximately 18 seconds in length, since after that time, the call goes to voicemail. If one considers a 20 second cutoff with typical encoding for music at 192 kilobytes per second, the resulting data file is 480 kilobytes (20 seconds×192 kilobits per second). In experimentation, it was determined that a 480 kilobyte cutoff resulted in some incorrect classifications while a 300 kilobyte cutoff reduced errors to a low rate.

In addition to file size analysis, the file analyzer 114 may perform file duration analysis. In this scenario, the logic of the file analyzer 114 keys off the duration of playback of the downloaded file. For example, two .mp3 files of similar sizes can have very different durations based on the type of data compression used when the music file was digitized. Thus, a relatively short file size may be expanded to a relatively longer file duration during playback. The file analyzer 114 can use a file size analysis or a file duration analysis alone or may utilize the combination of file size and file duration analyses.

Metadata analysis can also be used by the file analyzer 114 to determine the content type of a downloaded file. For example, downloaded music files or video files often have metadata identifying, by way of example, artist name, album, track name, actor name, movie title, character name, or the like. Other forms of downloaded data files may have different forms of metadata that may also be used by the file analyzer 114 to determine content type.

Alternatively, a variant of metadata analysis permits the file analyzer 114 to analyze network information to determine the content type. For example, the metadata or a Uniform Resource Locator (URL) may be included with the downloaded file. The file analyzer 114 may use any network reference included in metadata or it may use the URL to obtain additional information available over the network that more fully describes the downloaded file.

As previously discussed, a MIME type may also be included with the data. Although not all downloaded data files include a MIME type, data that is downloaded with a MIME type can sometimes be readily identified by the file analyzer 114.

The operation of the file analyzer 114 has been discussed above with respect to a number of different available pieces of data that may be used to determine the content type. Other data, not directly related to the received data file, can also be used. For example, the source of the data file and the time of day the data file was downloaded to the mobile device 100 are useful pieces of information to determine the content type.

The file analyzer may use any of these forms of file analysis to identify the content type of downloaded file. However, in addition to individual forms of analysis, the file analyzer 114 may advantageously combine multiple different analytic techniques to more accurately and reliably determine file content type. The mobile device 100 may contain a rules-based analysis in which a combination of the individual analytical techniques may be combined in any sequence of independent or dependent steps based on application of one or more rules. For example, a rule could indicate that a particular sequence of analytical steps should be performed by the file analyzer 114 if the downloaded file has a .mp4 extension while a different sequence and group of rules would be applied if there is no extension at all.

In one embodiment, a series of hierarchical rules-based analysis steps can be hard-coded into the mobile device 100 and stored, by way of example, in the memory 104. In another example, the mobile device may include a rules file, such as an XML file, that is embedded in the mobile device 100 at the time of manufacture and can be readily updated using conventional over-the-air techniques. This advantageously allows new forms of analysis to be implemented by the file analyzer 114. For example, a cooperative agreement among vendors may result in an industry-wide accepted format for naming music files. If such a format was not previously programmed into the rules structure in the file analyzer 114, they may be readily downloaded using over-the-air programming such that the file analyzer 114 always includes up-to-date rules. As previously noted, updates may also be provided through other conventional techniques, such as via the I/O interfaces 116. The mobile device 100 may be coupled to a network, such as the Internet, and directed to a webserver than can download rules updates.

If the mobile device 100 accepts the downloaded file, then subsequent actions are taken depending on the identification of the content type and the specific requirements of the mobile device. For example, the downloaded content may need to be moved to specific locations, such as the application file storage areas described above. In other situations, the content may need to be transformed in some fashion, such as data decompression and/or decoding. In addition, device applications, processes, or other logic entities within the mobile device 100 may need to be informed or otherwise made aware of the newly delivered content.

After the final analysis, resolution, and determination of file content type by the file analyzer 114, the downloaded file may be either accepted by the mobile device 100 or rejected. Both acceptances and rejections can be announced to the user. For example, a message may be displayed that indicates a file cannot be stored because it is incompatible with applications on the device. In another example of a rejection, the file may not be compatible with the device, but may be stored anyway in a "lost and found" folder. Thus, the file may remain in the mobile device 100, but is not available to applications until further identification has occurred.

In situations where a file has been accepted, a message may be displayed to the user to indicate that the file has been stored in, by way of example, a music library and is now available to the music player on the mobile device 100. In another example, a message may be displayed to the user that a file has been downloaded to a music library and is available as both a .mp3 track, for example, as well as a ringtone. In this example, the file may be made available for storage in one or more locations, such as the application file storage associated with the music player as well as the application file storage associated with the ringtones application. In an alternative embodiment, the mobile device 100 need not generate an explicit message to a user to indicate that a new file has been delivered to the mobile device 100. As previously described, the new file may be delivered to the mobile device 100 in a variety of different fashions, such as downloading, sideloading, and the like. Mobile device 100 is not limited by any specific technique to actually deliver the file to the mobile device. In this embodiment, the new downloaded file simply becomes available and is displayed to the user when a particular application is activated. For example, if one or more new ringtone data files were loaded, they may simply be made available to the ringtone application. When the user subsequently activates the ringtone application, the newly downloaded ringtone data files will be displayed to the user along with any other previously stored ringtone data files.

The file analyzer 114 advantageously eliminates the need for a user to understand the complexities of file types and the variants of multimedia content. Users typically deliver content to the mobile device 100 that they assume will work on the device even though they do not have specific knowledge of the device application architecture. The intelligence of the file analyzer 114 allows the identification of file type and association with appropriate applications without the need for extensive user interaction and knowledge of application architecture. The file analyzer 114 allows the user to download content to the device without necessarily being encumbered by specific clients and/or other applications.

With multiple applications available on the mobile device 100, the file analyzer 114 allows greater flexibility in the downloading of content. The mobile device 100 provides a more open device that is less tightly coupled to specific services and specific service-related applications. This advantageously makes the mobile device 100 more widely usable with the varieties of content available from a larger number of services. For example, the mobile device 100 may download music files from multiple sources using multiple music formats and multiple music codecs rather than having to rely on a single application and a single source of downloadable files. This makes the mobile device 100 generally more compatible with any content, independent of the service provider. When the mobile device 100 does not have service-specific dependencies, the ability to deploy more services and more application capabilities is enhanced. This results in reduced costs to the consumer. The mobile device 100 also results in less complexity to the user and lower user confusion with the result of fewer calls to technical support facilities for a service provider.

Figure 2:
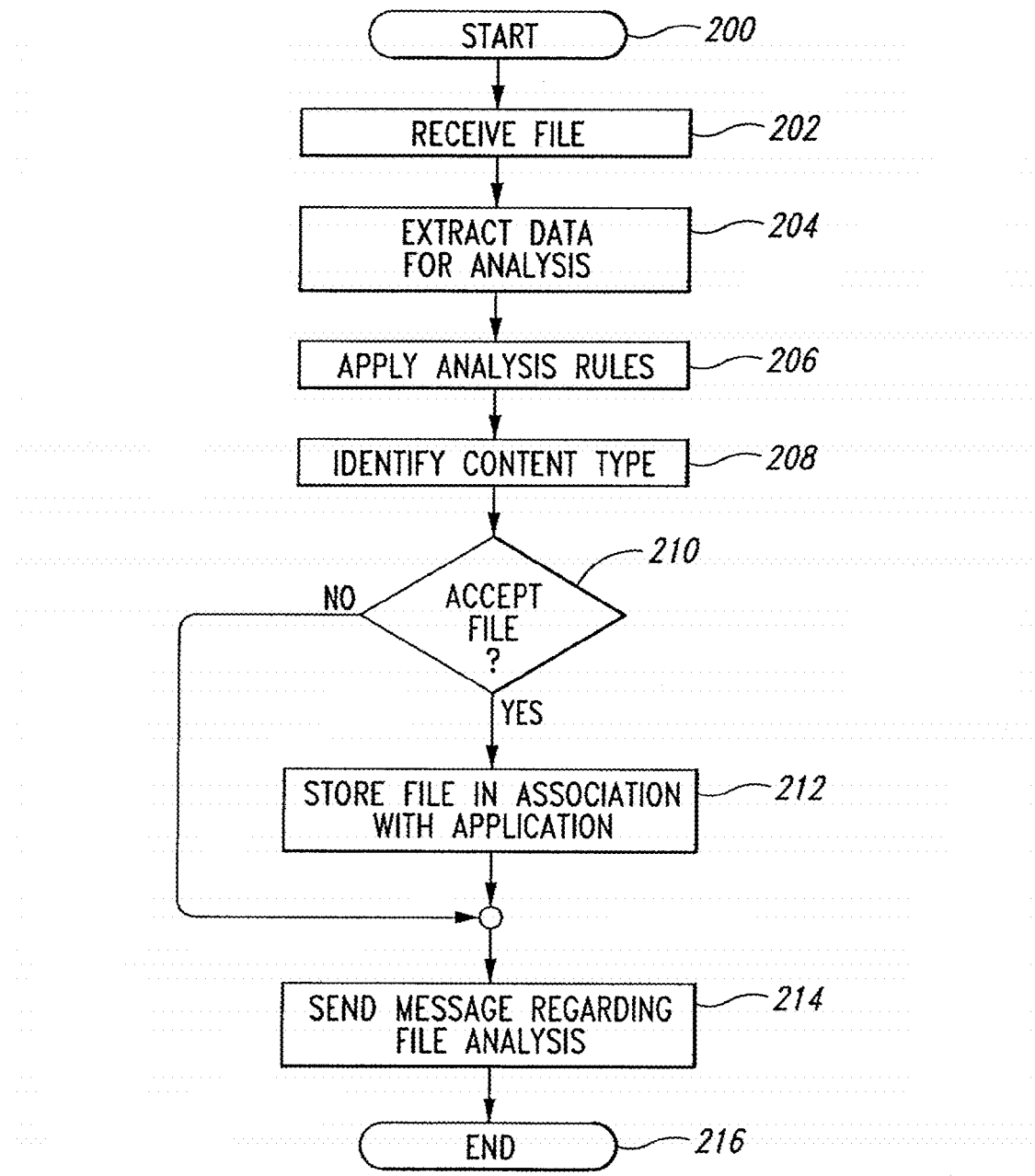
FIG. 2 is a flow chart illustrating the operation of the mobile device of FIG. 1.

An example implementation of the file analyzer 114 is described in the flow chart of FIG. 2. At a start 200, the mobile device 100 is under power. At step 202, the mobile device receives a data file. As previously discussed, the received data file may be provided over-the-air, via the transceiver 110 of FIG. 1, or via a number of different wired or wireless data transfer techniques using the IO interfaces 116. Indeed, in one embodiment, the unidentified data file physically transferred to the wireless device at all. The unidentified data file may be stored on a memory device, such as an SD microchip and analyzed by the file analyzer 114 without a physical transfer taking place. The mobile device 100 is not limited by the specific form in which the data file is downloaded to the mobile device.

At step 204, the file analyzer extracts data for analysis. Those skilled in the art will appreciate that the type of data extraction depends on what type of data might be available to the file analyzer. For example, MIME data type, meta data, file extension, file size, file playback duration, and the like, are all pieces of information that may be extracted directly from the downloaded file or may be readily derived from the downloaded file.

In step 206, the file analyzer 114 applies analysis rules. As discussed in detail above, the analysis may comprise one or more forms of analysis that may be applied independently, in conjunction with other forms of analysis, or the like. In addition, the rules may include hierarchical analysis based on an initial extraction of data, such as described above.

Following the completion of one or more types of file analysis, the file analyzer 114 identifies the file content type in step 208. In decision 210, the file analyzer 114 determines whether the mobile device 100 should accept the downloaded data file. If the file analyzer identifies an appropriate application and accepts the download, the result of decision 210 is YES and, in step 212, the downloaded file is stored in association with one or more applications in the mobile device.

If the file analyzer 114 cannot identify the file content or if the file content is identified as incompatible with the mobile device 100 in some fashion, the file analyzer 114 will not accept the download and the result decision 210 is NO. Alternatively, the mobile device 100 may simply generate a message to the user indicating that the file analysis resulted in rejection of the file. The user may nonetheless choose to accept the file. For example, the user may wish to use the mobile device 100 to temporarily store a word processing data file even though the mobile device has no word processing application and cannot display the document.

Following the storage of an accepted file in step 212, or the rejection of a download in decision 210, the file analyzer 114 may send one or more messages regarding the outcome of the file analysis. In one embodiment, an accepted file is included in a list associated with the application so that its content is available to the application. For example, a new song that is downloaded and accepted may be stored in association with a music player and the music player is made aware of the newly available music file. In addition, the file analyzer 114 may generate a message to the user of the mobile device 100 to advise them of the acceptance of a new file. Alternatively, a message to the user may indicate the rejection of a downloaded file and provide additional details regarding the reason for the rejection. The file analysis process ends at 216.

Figure 3:
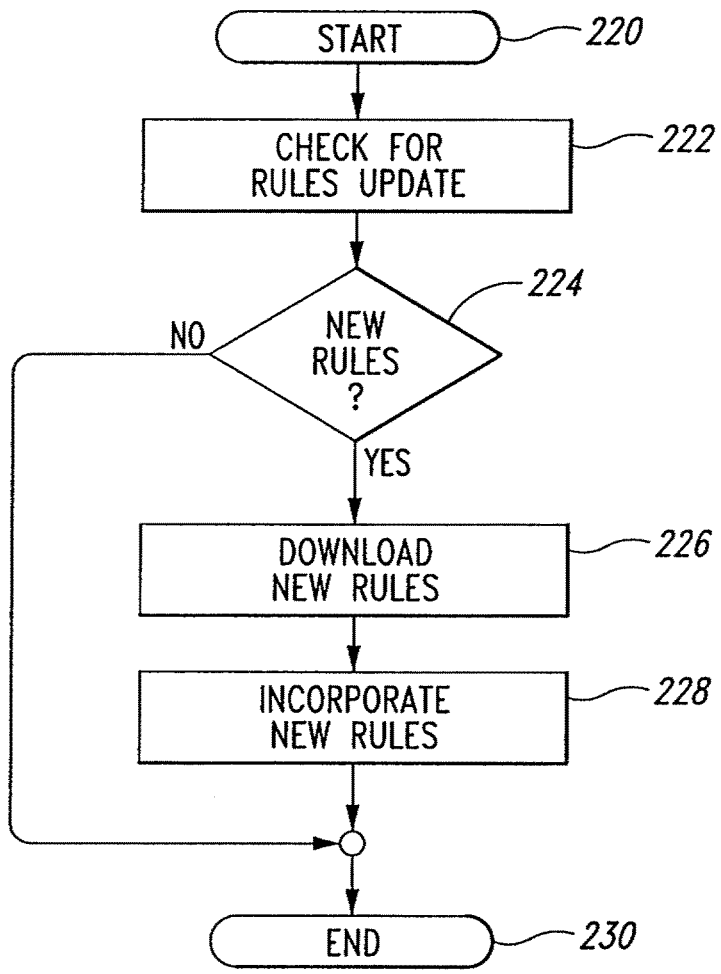
FIG. 3 is a flow chart illustrating a variation of the flow chart of FIG. 2.

FIG. 3 is a flow chart illustrating an alternative to the operation of FIG. 2 by illustrating a procedure for downloading data for new analytical techniques for the file analyzer 114. This may include supplemental information for existing rules and/or existing file analytical techniques as well as updates to create new rules and/or new file analytical techniques.

At step 220, the mobile device 100 is under power. At step 222, the mobile device may check for a rules update. Those skilled in the art will appreciate that rules update may be initiated based on a number of factors. In one example, the mobile device 100 may periodically check for new updates, such as once per month, or every Tuesday, or the like. Alternatively, the file analyzer 114 may check for updates by determining the date of the last update. If a sufficient period of time has passed since the last update, the mobile device 100 may check for a rules update. In yet another example, the mobile device 100 may check for rules updates whenever a new application is added to the mobile device. For example, the user may add an additional music playing application. When the new application is added to the mobile device 100, the file analyzer 114 may automatically check for rules associated with the new application or the expected content type for files associated with the new application. Those skilled in the art will appreciate that other techniques, known in the art, may be used to determine when to check for updated rules. For example, when new rules become available, the new rules can be "pushed" to the mobile device 100 by the network in the form of updates. This eliminates the need for the mobile device 100 to check for updates.

In decision 224, the mobile device 100 determines whether new rules are available. If new rules are available, the result of decision 224 is YES and, in step 226, the mobile device 100 downloads the new rules. In step 228, the new rules are incorporated into the mobile device 100. The form of incorporation depends on the nature of the rules update. For example, modifications or updates to existing rules may be handled in one manner while the addition of new, previously non-existent rules, may be added in a different manner. In addition, different hierarchical strategies may be downloaded in the form of rules. The specific form of incorporation of the downloaded new rules is within the scope of knowledge of one of ordinary skill in the art and need not be described in greater detail herein. In step 228, the mobile device 100 also stores the new rules.

If no new rules are available, the result of decision 224 is NO. In that case, or if new rules have been downloaded and stored in steps 226-228, the process ends at 230 with the mobile device 100 containing the most current set of rules for file analysis.

The foregoing described embodiments depict different components contained within, or connected with, different other components. It is to be understood that such depicted architectures are merely exemplary, and that in fact many other architectures can be implemented which achieve the same functionality. For example, the specification describes the operation of a file analyzer within a wireless communication device. However, the principles of the present invention may be applicable to other devices, such as a set top box or personal computer. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for analyzing a data file in a wireless communication device, comprising:
   receiving, by a processor of the wireless communication device, the data file of an unknown file content type;
   analyzing, by the processor of the wireless communication device, the data file that is received to determine a file content type, wherein the analyzing the data file to determine the file content type comprises analyzing a file duration of the data file to distinguish between a file content type of a ringtone and a file content type of a music file;
   associating, by the processor of the wireless communication device, the data file with one of a plurality of applications on the wireless communication device based on the file content type that is determined, wherein the wireless communication device comprises a mobile device;
   generating, by the processor of the wireless communication device, a notification indication to the one of the plurality of applications, wherein the one of the plurality of applications is related to the file content type that is determined; and
   determining, by the processor of the wireless communication device, whether the file content type that is determined is compatible with operation of the wireless communication device.

2. The method of claim 1, further comprising generating a user notification related to the file content type that is determined.

3. The method of claim 1, wherein the analyzing the data file further comprises analyzing a file name associated with the data file.

4. The method of claim 1, wherein the analyzing the data file further comprises analyzing a file name extension associated with the data file.

5. The method of claim 1, wherein the analyzing the data file further comprises analyzing a file content of the data file.

6. The method of claim 1, wherein the analyzing the data file further comprises analyzing a file size associated with the data file.

7. The method of claim 1, wherein the analyzing the data file further comprises analyzing a file metadata associated with the data file.

8. The method of claim 1, wherein the analyzing the data file further comprises analyzing a multi-purpose internet mail extension type associated with the data file.

9. The method of claim 1, wherein the analyzing the data file further comprises applying multiple forms of file analysis to the data file in accordance with a set of file analysis rules.

10. The method of claim 9, wherein the set of file analysis rules is stored in a storage area on the wireless communication device.

11. The method of claim 9, further comprising updating the set of file analysis rules.

12. The method of claim 9, wherein the set of file analysis rules comprises a sequence in which multiple file analysis techniques are used to analyze the data file.

13. The method of claim 1, further comprising temporarily storing the data file in a file storage location in the wireless communication device irrespective of the file content type that is determined.

14. The method of claim 1, wherein the data file is stored in a memory device attached to the wireless communication device wherein the analyzing the data file to determine the file content type comprises analyzing the data file stored in the memory device.

15. An electronic device comprising:
   a plurality of applications for operating in the electronic device;
   an interface for receiving an incoming data file of an unknown file content type; and
   a file analyzer for analyzing the incoming data file that is received to determine a file content type based upon a file duration of the data file, wherein the analyzing the incoming data file that is received to determine the file content type based upon the file duration of the data file distinguishes between a file content type of a ringtone and a file content type of a music file, and, based on the file content type that is determined, to associate the incoming data file with one of the plurality of applications, wherein the incoming data file is available for use by the one of the plurality of applications, wherein the electronic device comprises a mobile device, wherein the file analyzer is further for generating a notification indication to the one of the plurality of applications, wherein the one of the plurality of applications is related to the file content type that is determined; and for determining whether the file content type that is determined is compatible with operation of the electronic device.

16. The electronic device of claim 15, further comprising:
   a data storage structure for storing the incoming data file that is received irrespective of the file content type, the file analyzer being further for analyzing the incoming data file stored in the data storage structure.

17. The electronic device of claim 15, wherein the file analyzer is further for generating a user notification related to the file content type that is determined.

18. The electronic device of claim 15, wherein the file analyzer is further for applying multiple forms of file analysis to the incoming data file in accordance with a set of file analysis rules.

19. The electronic device of claim 18, wherein the set of file analysis rules are stored in a storage area on the electronic device.

20. The electronic device of claim 18, wherein the set of file analysis rules are stored in a storage area remote from the electronic device.

21. The electronic device of claim 18, wherein the file analyzer is further for updating the set of file analysis rules.

22. The electronic device of claim 18, further comprising:
a receiver having a wireless communication link with a communication network and for receiving an updated set of file analysis rules via the wireless communication link.

* * * * *